UNITED STATES PATENT OFFICE.

WILLIAM BUTCHER AND WILLIAM A. BUTCHER, OF PHILADELPHIA, PA.

IMPROVEMENT IN INDIA-RUBBER PAINT.

Specification forming part of Letters Patent No. 18,183, dated September 15, 1857.

*To all whom it may concern:*

Be it known that we, WILLIAM BUTCHER and WILLIAM A. BUTCHER, of the city and county of Philadelphia, and State of Pennsylvania, have invented a new and Improved Method of Making Water-Proof Paint; and we do hereby declare that the following is a full and exact description of the ingredients used in the same and the method of preparing and applying them.

The nature of our invention consists in preparing and combining certain specified articles to form a paint that shall be, when applied and dried, impervious to moisture and water.

To enable others skilled in the art to make and use our invention, we will proceed to describe the process and materials used by us.

We take one gallon of linseed-oil and put into it from eight to twelve pounds of crude india-rubber, and boil them in a suitable vessel until the rubber is entirely dissolved. We then grind the preparation thus obtained in a paint-mill with any of the coloring-matters in ordinary use (according to the colored paint desired) for the thorough admixture of it with the color. We then thin it with painter's oil to the proper consistency, and it is ready to be applied in the same manner as ordinary paint. The quantity of rubber dissolved in the oil may be varied to produce a thick or thin coating of it in the paint when dried, as may be required by the particular exposure of the part to which it is applied—as, for example, the front or sides of the building would not require as heavy a coating to protect them as would the roof.

The paint, when dried, being impervious to water and not subject to injury from heat or cold, and not liable to injury from the elasticity of the rubber by the shrinking or swelling of boarded surfaces or the pliability of canvas or cloth when painted with it, makes it peculiarly adapted to the purpose for which it is designed.

What we claim as our invention, and desire to secure by Letters Patent, is—

The composition prepared and composed of the materials as herein described, for the purpose of making water-proof paint.

WM. BUTCHER.
WM. A. BUTCHER.

Witnesses:
JOHN THOMPSON,
WM. GARRIGUES.